United States Patent
Min et al.

(10) Patent No.: US 6,760,467 B1
(45) Date of Patent: Jul. 6, 2004

(54) FALSIFICATION DISCRIMINATION METHOD FOR IRIS RECOGNITION SYSTEM

(75) Inventors: Seung Gi Min, Seoul (KR); Jang Jin Chae, Kunpo (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/532,042

(22) Filed: Mar. 21, 2000

(30) Foreign Application Priority Data

Mar. 23, 1999 (KR) .......................................... 1999/9843

(51) Int. Cl.[7] .................................................. G06K 9/00
(52) U.S. Cl. ........................ 382/117; 351/209; 396/51
(58) Field of Search ............................... 382/103, 117, 382/190, 115, 191, 155, 209, 291, 312, 317, 324; 351/221, 210, 209, 206, 205; 396/51, 50, 123, 57, 18; 434/155, 159, 271; 348/139, 335

(56) References Cited

U.S. PATENT DOCUMENTS

| | | | |
|---|---|---|---|
| 4,461,349 A | | 7/1984 | Wunderlich ................ 166/245 |
| 4,641,349 A | * | 2/1987 | Flom et al. .................. 382/117 |
| 5,196,873 A | * | 3/1993 | Yamanobe et al. .......... 351/210 |
| 5,291,560 A | | 3/1994 | Daugman ....................... 382/2 |
| 5,359,669 A | * | 10/1994 | Shanley et al. ............. 382/117 |
| 5,410,376 A | * | 4/1995 | Cornsweet et al. .......... 351/210 |
| 5,572,596 A | * | 11/1996 | Wildes et al. ............... 382/117 |
| 5,614,967 A | * | 3/1997 | Ishikawa et al. ............. 351/210 |
| 5,644,642 A | * | 7/1997 | Kirschbaum ................ 382/131 |
| 5,734,930 A | * | 3/1998 | Hagiwara .................... 396/123 |
| 5,956,122 A | * | 9/1999 | Doster ......................... 351/210 |
| 6,309,068 B1 | * | 10/2001 | Kohayakawa ................ 351/221 |
| 6,333,988 B1 | * | 12/2001 | Seal et al. .................... 382/117 |
| 6,424,727 B1 | * | 7/2002 | Musgrave et al. ........... 382/117 |

FOREIGN PATENT DOCUMENTS

JP          10-162146          6/1998

OTHER PUBLICATIONS

Williams, G.O, "Iris Recogntion Technology", IEEE 1996 International Conference on Security Technology, Oct. 2–4, 1996, pp. 46–59.*

* cited by examiner

Primary Examiner—Jayanti K. Patel
(74) Attorney, Agent, or Firm—Fleshner & Kim, LLP

(57) ABSTRACT

The present invention relates to a technique for checking if the reflected image of a light emitting diode for lighting is detected in the image of an iris and determining whether the iris is a living one in order to prevent an illegal intrusion using a simulacrum such as a photograph or dynamic image. The object of the present invention is achieved by a first step of imaging an eye of the user when the user approaches the field of view, processing the image signal, and capturing the image of the iris and pupil, a second step of selectively lighting LEDs for lighting installed on the both sides of a camera while imaging the eye of the user and detecting the reflected image of a corresponding LED in the image of the iris and pupil, a third step of determining that the iris is a falsification and informing the system of the fact if the reflect image of a the corresponding light emitting diode is not detected in the above steps, and determining that the iris is really recognized if detected, and a fourth step of performing a recognition of an iris image signal using a database if the iris is proven to be really recognized and determining whether the image is data registered in the database.

26 Claims, 3 Drawing Sheets

FALSIFICATION DISCRIMINATION METHOD FOR IRIS RECOGNITION SYSTEM

BACKGROUND OF THE INVENTION

1. Field of the Invention

The present invention relates to a technique for discriminating falsification of an iris image in an iris recognition system and, more particularly, to a falsification discrimination method for an iris recognition system which makes it possible to capture an image of a pupil when changing the position of the light source in order to prevent an intrusion attempt using a photograph or dynamic image, and determine whether the iris is true or false based on the position reflected from the image.

2. Description of the Prior Art

The pupil of a human eye continues contracting and expanding. In a conventional iris recognition system, the contracted and expanded states of the pupil is detected considering such a characteristic of the eye, and, on the basis of the resulting states, falsifications in a continuous image is discriminated.

However, in order to detect the contracted and expanded states of the pupil in this manner, a series of steps of finding the position of the pupil and obtaining the radius must be performed repeatedly, so that it takes much time for detection and it is difficult to performing an accurate detection.

Reference is made to U.S. Pat. No. 4,641,349 "Iris Recognition system", U.S. Pat. No. 5,291,560 "Biometric Personal identification System base on Iris Analysis, and U.S. Pat. No. 5,572,596 "Automated Non-Invasive iris Recognition System and Method.

However, in these conventional iris recognition systems, they are constructed in such a manner that it is determined whether the iris is true or false based on the contracted and expanded states of the pupil. Thus, it takes much time for detection and it is difficult to performing an accurate detection. In addition, when a dynamic image in place of a photograph is illuminated continuously, the size of the pupil varies according to the time, thereby making it difficult to discriminate a falsification.

SUMMARY OF THE INVENTION

Accordingly, it is an object of the present invention to provide a falsification discrimination method for an iris recognition system which is capable of analyzing an iris image while changing the position of the light source in a system having many light sources used for a lighting apparatus, and determining whether the iris is true or false based on the reflected position.

Additional advantages, objects and features of the invention will become more apparent from the description which follows.

BRIEF DESCRIPTION OF THE INVENTION.

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS.

A preferred embodiment of a falsification discrimination method for an iris recognition system to achieve the object of the present invention comprises a first step(S1 and S2) of imaging an eye of an user when the user approaches a field of view, processing the image signal, and determining whether or not the image is precisely focused, a second step(S3–S8) of selectively lighting LEDs for lighting installed on the both sides of a camera while imaging the eye of the user and detecting the reflected image of a corresponding LED in the image of the iris and pupil, a third step(S9 and S10) of determining that the iris is a falsification and informing the system of the fact if the reflected image of the corresponding LED is not detected in the above steps, and a fourth step(S11, S12, and S13) of determining whether the image is data registered in a database if the reflected image is detected, and informing the system of the confirmation of a living iris if the iris is really recognized or informing the system of the rejection of a non-living iris if the iris is not really recognized.

Another preferred embodiment of a falsification discrimination method for an iris recognition system to achieve the object of the present invention comprises a first step(S1 and S2) of imaging an eye of the user when the user approaches the field of view, processing the image signal, and capturing the image of the iris and pupil, a second step(S3–S8) of selectively lighting LEDs for lighting installed on the both sides of a camera while imaging the eye of the user and detecting the reflected image of a corresponding LED in the image of the iris and pupil, a third step(S9 and S10) of determining that the iris is a falsification and informing the system of the fact if the reflected image of the corresponding LED is not detected in the above steps, and a fourth step(S11, S12, and S13) of determining whether the image is data registered in a database if the reflected image is detected, and informing the system of the rejection of a non-living iris if the iris is really recognized, and a fourth step(S11, S12, and S13) of determining again whether is the iris is a falsification if the iris is really recognized in the above steps and informing the system of the fact if the iris is a falsification or informing the system of the confirmation of a living iris if the iris is not a falsification.

Figure 1:
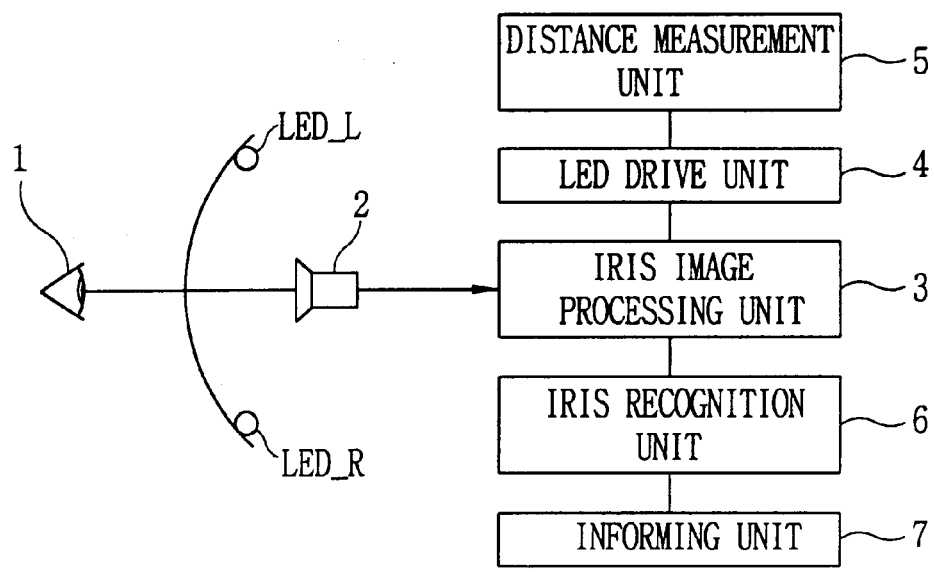
FIG. 1 is a block diagram of an iris recognition system to which a falsification discrimination method in accordance with the present invention is applied.

FIG. 1 is a block diagram of an iris recognition system to which a falsification discrimination method in accordance with the present invention is applied. As shown therein, the iris recognition system comprises a camera 2 for imaging the eye 1 of a person attempting to be recognized; an iris image processing unit 3 for capturing the image of the iris and pupil by processing an output image signal of the camera 2, outputting a lighting control signal of light emitting diodes LED_L and LED_R while confirming whether a LED image is presented on a corresponding image in the pupil image, and determining whether the iris image is true or false; a light emitting diode drive unit 4 for lighting the light emitting diodes LED_L and LED_R for lighting installed at the right and left sides of the camera 1 from the eye 1 according to the lighting control signal; a distance measurement unit 5 for measuring the distance from the camera 2 to the eye 1 utilizing infrared light; an iris recognition unit 6 for performing an iris recognition process using a database when it is confirmed that the iris is imaged as the result of the comparison; and an informing unit 7 for informing the system of iris recognition and falsification.

The operation of the present invention thusly constructed will be described in detail as follows with reference to FIGS. 2 and 3.

The distance measurement unit 5 transmits infrared light to the front of the camera 2, and determining whether the user approaches the field of view on the basis of the infrared light incident which is reflected by the user. S1

In the above step, if it 1 confirmed that the user approaches the field of view, the eye 1 of the user is imaged by performing the zooming or focus control function while measuring the distance between the user and the camera 2 by the distance measurement unit 5. S2

The iris image processing unit 3 captures the image of the iris and pupil by processing the output image signal of the camera 2. At this time, as an example of light emitting diode at one side, the light emitting diode (e.g., LED_L) installed at the left side of the camera 2 from the eye 1 is lighted by the light emitting drive unit 4, and the reflected image of the light emitting diode LED_L is confirmed in the image of the iris and pupil. S3–S5

Similarly, the light emitting diode LED_R installed at the opposite side of the light emitting diode LED_L is lighted, and the reflected image of the light emitting diode LED_R is confirmed in the image of the iris and pupil. S6–S8

Figure 2:
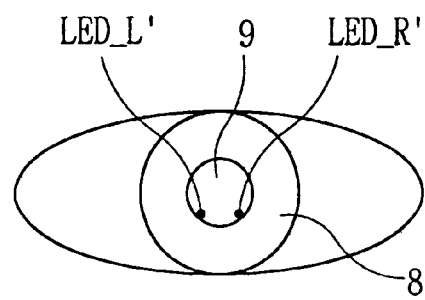
FIG. 2 is an illustration of a captured iris image.

The reason why the light emitting diodes LED_L and LED_R are lighted and the reflected images of the same are detected is in order to determine the iris of a living eye 1 is imaged when the image captured by the iris image processing unit 3 as shown in FIG. 2, That is, the reflected image of the light emitting diode LED_L at the left side and the light emitting diode LED_R at the right side in the image captured by the iris image processing unit 3 are presented on the pupil 9, respectively.

However, in the case that a photograph is taken or a dynamic image is utilized for falsification purposes, the reflected images of the light emitting diodes LED_L and LED_R are not presented on the pupil 9.

Therefore, the iris image processing unit 3 lights the left side light emitting diode LED_L, the right side light emitting diode LED_R, or both diodes as described in the above. At this time, it is determined whether the iris is true or false by confirming if the reflected image is presented on a corresponding position as above. If the iris is proven to be false, the fact is informed by the informing unit 7. S9–S10

And, it is determined whether the iris is one registered in a database in step 11, the confirmation of a living iris is informed by the informing unit 7 in the case that the iris is proven to be really recognized in step 13, and if the iris is not really recognized, it is determined that the iris is not one registered in the database, whereby an admission rejection is informed by the informing unit 7.

Figure 3:
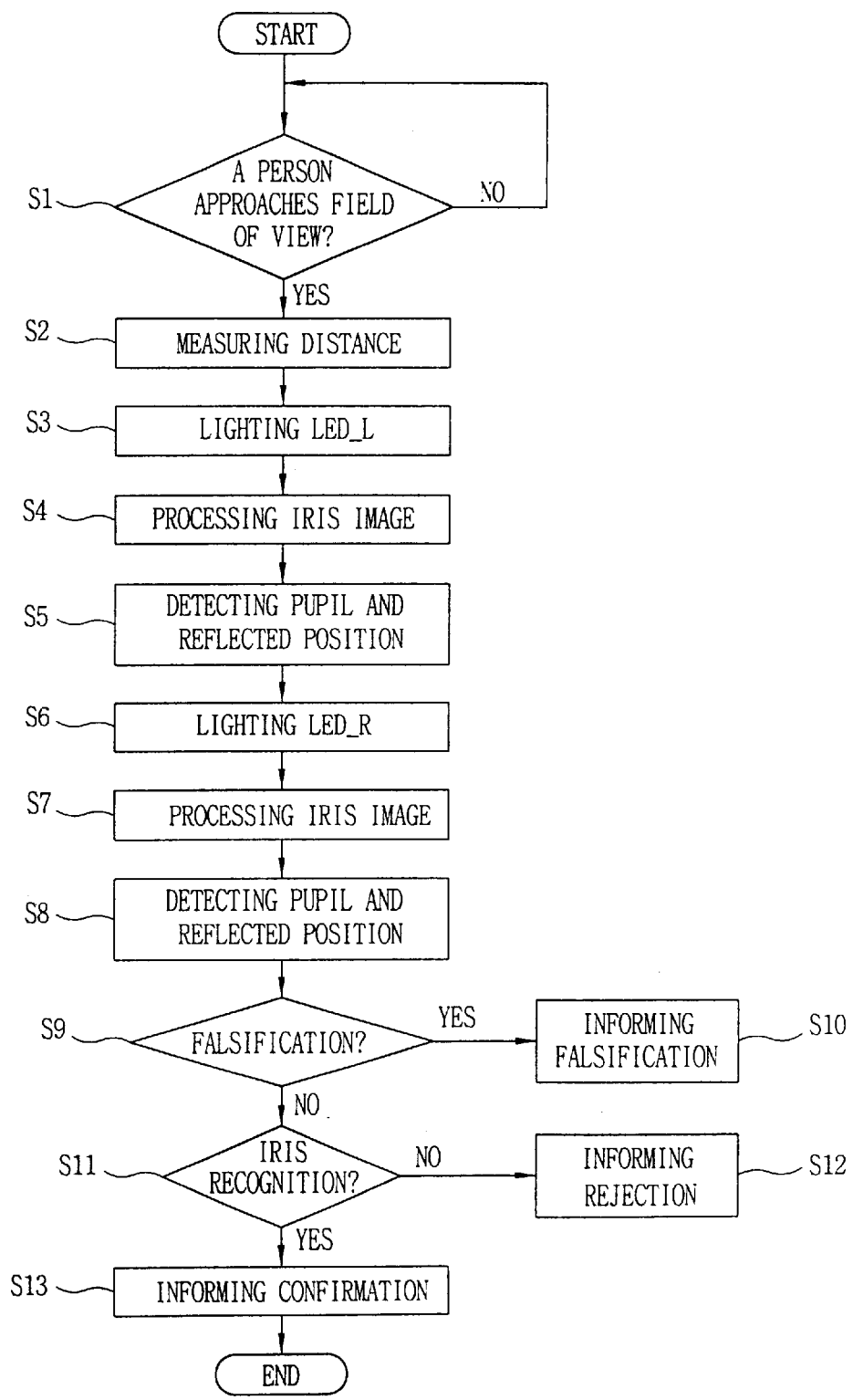
FIG. 3 is an embodiment of a signal flow chart showing a falsification discrimination method in accordance with the present invention.
Figure 4:
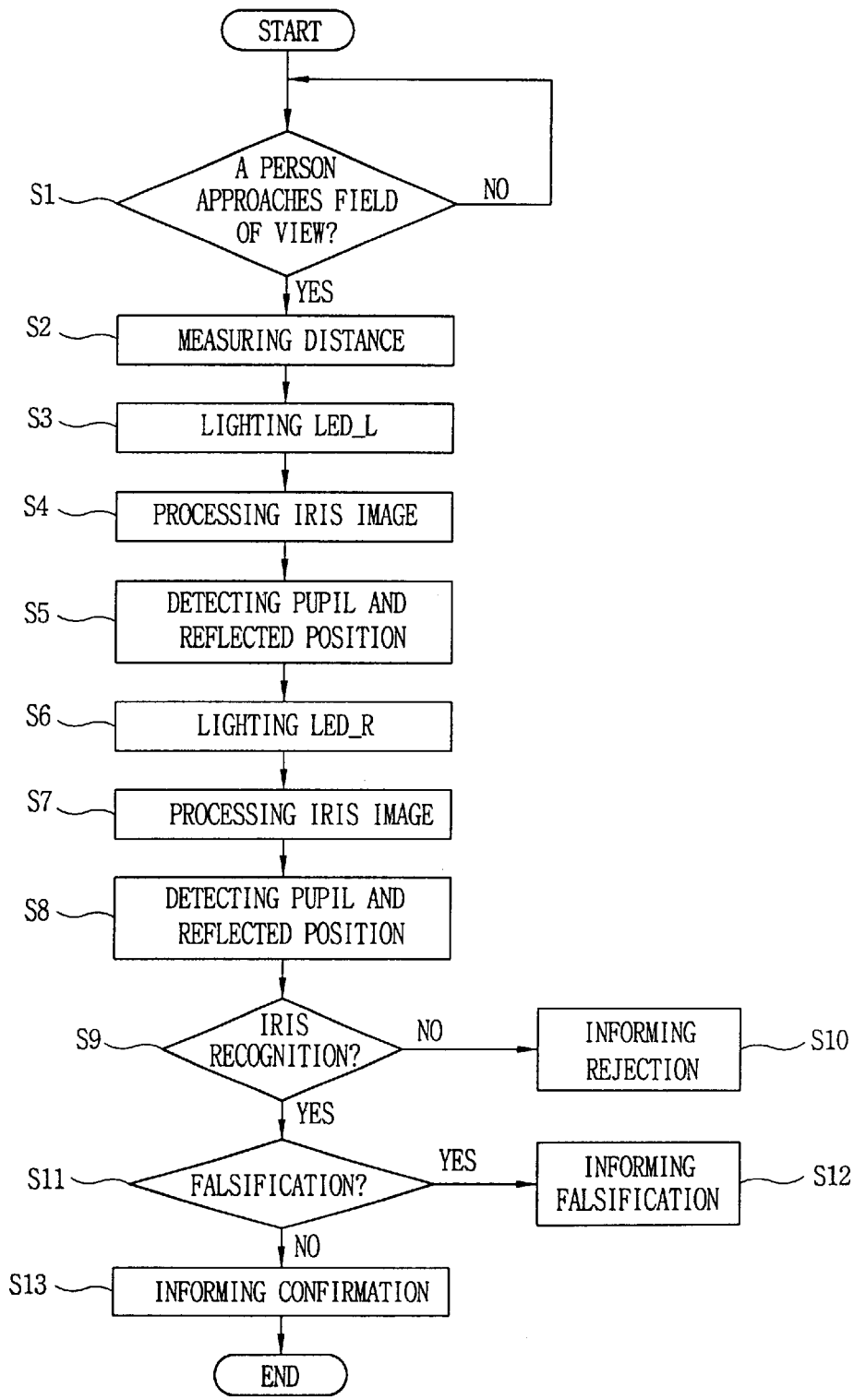
FIG. 4 is another embodiment of a signal flow chart showing a falsification discrimination method in accordance with the present invention.

FIG. 4 has the same steps from S1 to S8 as FIG. 3, and comprises the steps of determining whether the iris is one registered in the database in step 9, informing the system of the rejection if the iris is really recognized in step 10, determining again whether the iris is a falsification if the iris is not really recognized in step 11, and informing the system of the fact if it is a falsification in step 12 or informing the system of the confirmation if it is not a falsification in step 13.

As explained above in detail, the present invention has the effect of preventing an illegal intrusion using a photograph or dynamic image without fail by determining whether the iris is true or false based on the reflected position of the light source by analyzing the iris image while changing the position of the light source.

What is claimed is:

1. A falsification discrimination method for an iris recognition system, comprising:

a first step of imaging a user's eye when the user approaches a field of view, processing the image signal, and determining whether the image is precisely focused;

a second step of selectively lighting a light emitting diode installed near a camera during imaging while checking if the reflected image of a corresponding light emitting diode is presented in the image of the iris and pupil; and a third step of determining that the iris is a falsification and informing the system of the fact if the reflected image of the corresponding light emitting diode is not detected as the result of the comparison, and determining whether the iris is really recognized if the image is detected, wherein the selectively lighting of the light emitting diode comprises lighting at least two distinct light sources, and wherein the determining that the iris is a falsification comprises determining whether the reflected image comprises images of reflections of sequential lighting of the light emitting diodes corresponding to images of predetermined reflections of the sequential lighting of the light emitting diodes.

2. The method of claim 1, wherein, in the third step of determining whether the iris is not recognized, the confirmation of a living iris is informed if the iris is recognized using a database, and the rejection of a non-living iris is informed if the iris is not recognized.

3. The method of claim 1, wherein the second step is performed by sequentially lighting light emitting diodes for lighting installed near a camera.

4. The method of claim 1, wherein the second step is performed by lighting all the light emitting diodes for lighting installed near the camera.

5. The method of claim 1, wherein said selectively lighting a light emitting diode comprises lighting at least two distinct lighting sources during at least two different predetermined times that reflect off the user's eye as the reflected image.

6. The method of claim 5, wherein the determining that the iris is a falsification comprises determining whether the reflected image of the at least two distinct lighting sources are reflected correctly off the user's eye.

7. The method of claim 1, wherein the falsification discrimination method distinguishes actual, live irises of eyes from images of eyes including photographs of irises or dynamic images of irises.

8. A falsification discrimination method for an iris recognition system, comprising:

a first step of imaging a user's eye when the user approaches a field of view, processing the image signal, and capturing the image of an iris and pupil;

a second step of selectively lighting a fight emitting diode installed near a camera during imaging while checking if the reflected image of a corresponding light emitting diode is presented in the image of the iris and pupil; and a third step of determining whether the iris image is data registered in a database and informing the system of the rejection of a non-living iris if the iris is not really recognized and determining whether the iris is a falsification if the iris is really recognized, wherein the selectively lighting of the light emitting diode comprises lighting at least two distinct light sources, and wherein the determining that the iris is a falsification comprises determining whether the reflected image comprises images of reflections of sequential lighting of the light emitting diodes corresponding to images of predetermined reflections of the sequential lighting of the light emitting diodes.

9. The method of claim 8, wherein, in the third step of determining whether the iris is a falsification, a falsification is informed if the reflected image of the light emitting diode is not presented in the second step and the confirmation of a living iris is informed if the iris is not a falsification.

10. The method of claim 8, wherein the second step is performed by sequentially lighting light emitting diodes for lighting installed near a camera.

11. The method of claim 8, wherein the second step is performed by lighting all the light emitting diodes for lighting installed near the camera.

12. The method of claim 8, wherein selectively lighting a light emitting diode comprises lighting at least two distinct lighting sources during at least two different predetermined times that reflect off the user's eye as the reflected image.

13. The method of claim 12, wherein the determining that the iris is a falsification comprises determining whether the reflected image of the at least two distinct lighting sources are reflected correctly off the user's eye.

14. The method of claim 8, wherein the falsification discrimination method distinguishes actual, live irises of eyes from images of eyes including photographs of irises or dynamic images of irises.

15. In an iris recognition system, a falsification discrimination apparatus for an iris recognition system, comprising:
a camera for imaging the eye of a person attempting to be recognized;
an iris image processing unit for capturing the image of the iris and pupil by processing an output image signal of the camera, outputting a lighting control signal of light emitting diodes while confirming whether a LED image is presented on a corresponding image in the pupil image, and determining whether the iris image is true or false;
a light emitting diode drive unit for selectively lighting the light emitting diodes for lighting installed at the right and left sides of the camera from the eye according to the lighting control signal;
a distance measurement unit for measuring the distance from the camera to the eye utilizing infrared light; and
an iris recognition unit for performing an iris recognition process using a database when it is confirmed that the iris is imaged as the result of the comparison, and determining that the iris image is a falsification by determining whether the reflected image of a corresponding light emitting diode comprises images of reflections of sequential lighting of the light emitting diodes corresponding to images of predetermined reflections of the sequential lighting of the light emitting diodes.

16. The apparatus of claim 15, further comprising light emitting diodes that emit light from at least two distinct light sources, wherein the iris image processing unit confirms that a reflection of the at least two distinct light sources are correctly reflected on said iris in comparison to a predetermined reflection of the at least two distinct light sources.

17. The apparatus of claim 16, wherein the at least two distinct light sources emit light during at least two predetermined times and said reflection of the at least two distinct light sources are confirmed corresponding to said at least two predetermined times.

18. The apparatus of claim 16, wherein said reflection of the at least two distinct light sources are reflected off the surface of the eye of the person attempting to be recognized.

19. In an iris recognition system, a falsification discrimination apparatus for an iris recognition system, comprising:
a camera for imaging the eye of a person attempting to be recognized;
an iris image processing unit for capturing the image of the iris and pupil by processing an output image signal of the camera, outputting a lighting control signal of light emitting diodes while confirming whether a LED image is presented on a corresponding image in the pupil image, and determining whether the iris image is true or false;
a light emitting diode drive unit for selectively lighting the light emitting diodes for lighting installed at the right and left sides of the camera from the eye according to the lighting control signal;
a distance measurement unit for measuring the distance from the camera to the eye utilizing infrared light;
an iris recognition unit for performing an iris recognition process using a database when it is confirmed that the iris is imaged as the result of the comparison; and
an informing unit for informing the system of iris recognition and falsification, and determining that the iris image is a falsification by determining whether the reflected image of a corresponding light emitting diode comprises images of reflections of sequential lighting of the light emitting diodes corresponding to images of predetermined reflections of the sequential lighting of the light emitting diodes.

20. The apparatus of claim 19, further comprising light emitting diodes that emit light from at least two distinct light sources, wherein the iris image processing unit confirms that a reflection of the at least two distinct light sources are correctly reflected on said iris in comparison to a predetermined reflection of the at least two distinct light sources.

21. The apparatus of claim 20, wherein the at least two distinct light sources emit light during at least two predetermined times and said reflection of the at least two distinct light sources are confirmed corresponding to said at least two predetermined times.

22. The apparatus of claim 20, wherein said reflection of the at least two distinct light sources are reflected off the surface of the eye of the person attempting to be recognized.

23. A method, comprising:
lighting an eye using a first distinct light source;
processing a first iris image of said eye including a first reflection of said first distinct light source off said eye;
detecting a first pupil position of said eye and a first reflection position of said first distinct light source on said eye;
determining whether said first reflection position is correct;
lighting said eye using a second distinct light source in a position different from said first distinct light source;
processing a second iris image of said eye including a second reflection of said second distinct light source off said eye;
detecting a second pupil position of said eye and a second reflection position of said second distinct light source on said eye; and determining whether said second reflection is correct, wherein if said first and said second reflections are correct, then an iris recognition is performed.

24. The method of claim 23, wherein determining whether said first and said second reflection positions are correct comprises comparing said reflection positions corresponding to said first and second distinct light sources to predetermined positions of said first and second distinct light sources, wherein the method further comprises:

identifying a person after said first and second reflection positions are determined to be correct by identifying said eye in a database.

25. A falsification discrimination method for an iris recognition system, comprising:

selectively lighting light sources installed at the iris recognition system; and determining that an iris image is a falsification by determining whether the reflected image of a corresponding light source comprises iris images of reflections of sequential lighting of the light sources corresponding to images of predetermined reflections of the sequential lighting of the light sources.

26. The method of claim 25, wherein a position of the corresponding light source is changed.

* * * * *